3,259,478
BACTERIA-INHIBITED FUEL COMPOSITION
Helen I. Thayer, Oakmont, Pa., assignor to Gulf Research & Development Company, Pittsburgh, Pa., a corporation of Delaware
No Drawing. Filed Mar. 27, 1963, Ser. No. 268,461
14 Claims. (Cl. 44—75)

This invention relates to inhibiting growth of slime-promoting microorganisms in the presence of hydrocarbon distillate fuels.

Previous investigations have indicated that microorganisms can be a primary cause of deposit formation in the water bottoms of jet fuel storage tanks. The microorganisms tend to emulsify fuel and water and form semi-solid residues or slimes, which hold the microorganisms themselves, living and dead, and their by-products, rust particles, and other minute debris in suspension. These slimes or residues, in turn, can plug aircraft fuel filters and foul aircraft tank gauges, and otherwise interfere with normal use of the fuel. They also are considered to contribute to wing tank corrosion in aircraft by effectively holding water in contact with the tank skin.

A wide variety of microorganisms, including aerobic and anaerobic bacteria, antinomycetes and fungi of types known to inhabit soil, fresh water and salt water, and some of whose spores are even airborne, have been found to subsist in jet fuel tank bottoms. These microorganisms appear to require water for life and to thrive at the oil-water interface, but under proper conditions can extend well into the fuel phase. Although microorganisms capable of subsisting upon a variety of petroleum hydrocarbon fractions have been known for some time, the problem has become serious with the advent of jet aircraft, as the kerosene-grade petroleum fractions employed as jet fuels, i.e., aviation turbine fuels, tend to entrain relatively larger proportions of water and to form more stable suspensions of water than other fuel fractions. Contamination of jet fuel by microorganisms is also a relatively more serious problem, since a greater number of varieties of microorganisms seem to show a preference for the hydrocarbons that are contained in jet fuels. In addition, the problem is more serious for jet fuels than for other fuels at any given level of contamination because of the very high rates of fuel consumption by jet aircraft.

It has been proposed to avoid fuel contamination with microorganisms by taking precautions to ship only clear, essentially dry fuels from the refineries and to keep fuel lines and tankage free from water bottoms and rust. This procedure is not entirely satisfactory, however, as the low spots in flat bottom tanks can never be drained completely, and as air that enters the tankage through atmosphere vents continually introduces additional moisture into the fuel through condensation of atmospheric moisture. It has also been proposed to alleviate microbial fuel contamination by the use of biocidal substances. For example, borax has been proposed for addition to contaminated water bottoms in fuel tanks. Unfortunately, borax has not been found especially effective in practical concentrations against the kinds of microorganisms present in jet fuel tank bottoms. Other materials also have been found unsuitable because of adverse effects on the metals forming the fuel system and engine parts, e.g., rust and corrosion, upon organic metal coatings or upon the fuel properties, e.g., sulfur content, gum-forming tendencies, water separability, acid number, thermal value, dielectric constant, particulate matter content, or the like.

The present invention relates to inhibiting growth of microorganisms in distillate hydrocarbon fuels, such as jet fuels, whereby problems of malfunction of fuel systems and corrosion attributable to such microorganisms are markedly reduced or alleviated without adversely affecting other factors governing the quality of the fuel. I have found that the growth of microorganisms in fuel-containing systems can be inhibited by incorporating in the fuel a small amount of at least one member of the group consisting of 2-nitroresorcinol, 4-nitroresorcinol, 4-nitrosoresorcinol and nitrocatechol, and the present invention includes fuel oils so inhibited either in or out of contact with contaminated water phase, as well as the process of treating contaminated, binary fuel-water systems. The biocidal materials referred to can be introduced into the contaminated fuel-water system either as such, by direct addition to individual fuel storage systems, or in the form of a solution or suspension in the fresh fuel supplied to the storage facilities, or in other ways.

When the biocidal materials are added to individual fuel storage systems or tanks containing contaminated water or to the fuel before storage in a contaminated or potentially contaminable system, some biocidal effect will be noted at concentrations of as little as 0.02 percent by weight of the fuel, but I prefer to employ the disclosed materials in larger amounts of at least 0.1 percent by weight of the fuel. The herein-disclosed antimicrobial agents can be added to the fuel in any effective amounts greater than those described above, up to the limit of solubility in the fuel and in the water bottoms, that will not adversely affect the combustion characteristics, corrosiveness, gum-forming tendencies, water separability, acid number, sediment content, effect on organic coatings, and other factors affecting the quality of the fuel. As a practical matter, no additional advantages normally will be obtained from the standpoint of biocidal activity by the use of amounts in excess of about 0.2 percent by weight of the fuel, but greater amounts can be used.

In basing the proportions of antimicrobial agent upon the weight of the fuel, I do not mean to imply that the amount indicated necessarily remains entirely in the oil phase. The antimicrobial agents of this invention may partition themselves to some extent between both phases of a fuel-water binary system, although they are in fact preferentially oil-soluble.

The biocidal agents disclosed herein can be incorporated in the fuel oils before or after contact with a source of microbial contamination, and they can be employed either as such or in admixture with compatible diluents, solvents or blending agents that do not materially impair the biocidal action of the agents. For example, they can be employed with 0.05 to 0.15 percent by weight of the fuel of an antiicing agent containing a 9:1 weight ratio mixture of ethylene glycol monomethyl ether and glycerol.

The effectiveness of the herein-disclosed agents for the purposes of this invention was demonstrated by testing in the presence of fuel oil microorganisms. Thus, eight microorganism isolates—each possibly containing several related but distinct genera and/or species of microorganisms—considered representative of the microbiological flora of jet fuel, were prepared from contaminated jet fuel samples obtained from a number of storage installations. These eight isolates, or microorganism groups, were generally classified as follows: green fungus, brown fungus, grey fungus, yellow-green fungus, black fungus, opaque bacterium, mucoid bacterium, and transparent bacterium. Five- to seven-day cultures of the fungi and two- to three-day cultures of the bacteria were streaked on Sabouraud's agar and nutrient agar plates, respectively. Filter paper discs 12.7 mm. in diameter were moistened with about 0.2 ml. of aviation turbine fuel containing 0.1 percent by weight of the fuel of the test compound and placed on each agar plate, and the plates were incubated at 25° C. for a period of five days for the fungi and two days for the bacteria. The effectiveness of the test compound in preventing the growth of microorganisms was determined by examining the zones of inhibition which appeared as clear areas within which no growth occurred, and measuring such zones in millimeters from the edge of the disc to the border of growth.

tains approximately one gallon of water bottoms contaminated with deposit-promoting microorganisms, and the two liquids are maintained in contact—with normal fuel withdrawal—for a period of time sufficient to inhibit growth of the microorganisms. After 11 days at ambient conditions, a period normally sufficient to permit vigorous microbial growth, no growth is observed.

In still another embodiment, 2-nitroresorcinol in the form of a concentrated fuel oil solution is metered into

|  | Opaque Bact. | Mucoid Bact. | Transparent Bact. | Green Fungus | Brown Fungus | Grey Fungus | Yellow-Green Fungus | Black Fungus |
|---|---|---|---|---|---|---|---|---|
| 2-Nitroresorcinol | 2 | 0 | 0 | 16 | 0 | >20 | 17 | >20 |

The effectiveness of the herein-described materials for the purposes of the present invention was further demonstrated by dissolving 2-nitroresorcinol in various concentrations in separate, 40 ml. samples of aviation turbine fuel and adding aseptically each such sample to separate, 250 ml. screw-cap Erlenmeyer flasks containing 10 ml. of inoculated broth. Nutrient broth was used for the bacteria and Sabouraud's broth for the fungi. These tests were carried out with each of the eight isolates previously mentioned. The flasks were incubated at 25° C. for 30 days, after which subcultures were made on the respective agars to determine the presence or absence of growth. The subcultures were rated 0 for no growth or + for growth. The results of the tests were as follows.

a refinery stream of a No. 2 fuel oil in a proportion sufficient to produce a concentration of 0.1 percent 2-nitroresorcinol by weight of the fuel oil. The oil is then directed into a tank containing contaminated water bottoms. Thereafter microbial growth in the water bottoms is terminated and maintained indefinitely at a low level by intermittent introduction of fresh, inhibited fuel oil to the tank to replace normal withdrawals.

In still another embodiment, there is added to a 50,000 gallon tank of JP–5 aviation turbine fuel having a specific gravity of 0.82 and containing contaminated water bottoms in the amount of about 250 gallons, approximately 340 pounds of 2-nitroresorcinol.

The invention is not limited to the 2-nitroresorcinol,

|  | Opaque Bact. | Mucoid Bact. | Transparent Bact. | Green Fungus | Brown Fungus | Grey Fungus | Yellow-Green Fungus | Black Fungus |
|---|---|---|---|---|---|---|---|---|
| 2-Nitroresorcinol: | | | | | | | | |
| 0.025 Wt. percent | + | 0 | + | 0 | + | 0 | 0 | 0 |
| 0.050 Wt. percent | + | 0 | + | 0 | + | 0 | 0 | 0 |
| 0.075 Wt. percent | + | 0 | 0 | 0 | + | 0 | 0 | 0 |
| 0.100 Wt. percent | + | 0 | 0 | 0 | + | 0 | 0 | 0 |

As will be seen from the foregoing test results, growth of all but two of the isolates is inhibited by 2-nitroresorcinol.

The effectiveness of the herein-disclosed biocidal agents was further demonstrated by adding 0.3 gram of each of 2-nitroresorcinol, 4-nitrosoresorcinol and mixed isomers of nitrocatechol to separate, 300 ml. samples of a furnace oil falling within the specifications of a No. 2 fuel oil, and adding the treated oil samples to separate flasks each containing 50 ml. of sterile mycophil broth; the respective mixtures in turn were inoculated with a mixed culture of microorganisms taken from aqueous tank bottoms from furnace oil tanks. The flasks were stoppered with a cotton plug and stored at room temperature in the dark. The samples were examined once each week for 60 days, and the amount of growth rated according to the following scale: 0=none, ±=questionable, +=slight, 2+= fair, 3+=good, 4+=excellent. The test is terminated at 4+ growth rating or 60 days. The results were as follows:

|  | 1 | 2 | 3 |
|---|---|---|---|
| Additives, Wt. Percent of Fuel: | | | |
| 2-Nitroresorcinol | 0.1 | | |
| Nitrocatechol | | 0.1 | |
| 4-Nitrosoresorcinol | | | 0.1 |
| Bacteriological Tests: | | | |
| 60-Day Culture Test Bacteria Growth | 0 | ¹ 0 | ¹ 0 |

¹ Solution too dark to permit rating after 60 days. Rating based on plate subculture after 60 days.

In contrast to the foregoing results an inoculated control fuel sample permitted 4+ growth after only 11 days.

In a practical embodiment, 898 grams of 2-nitroresorcinol is added to the fill line of a 275 gallon tank of furnace oil falling within the specifications of a No. 2 fuel oil, that has a specific gravity of 0.85 and that connitrocatechols, or 4-nitrosoresorcinol utilized in the specific embodiments described herein, as good results will also be obtained by the use of other biocidal materials indicated herein in the same or equivalent proportions. For example, there can be used 3-, 4-, 5-, or 6-nitrocatechol individually, 4-nitrosoresorcinol, or mixtures of any two or more of the materials disclosed herein.

If desired, the herein-disclosed biocidal materials can be added to the fuel oils or fuel oil storage systems in admixture with other water and/or oil-soluble agents such as antiicing agents, corrosion inhibitors, sequestering agents, oxidation inhibitors, antifoam agents, combustion improvers, and/or other agents adapted to improve one or more proporties of the oil.

Jet fuels, that is, aviation turbine fuels, are defined in Tentative Specification D–1655–59T of the ASTM Standards on Petroleum Products and Lubricants. No. 2 fuel oils are defined in ASTM Tentative Specification D–396–61T.

In view of the broad spectrum of biocidal activity shown by the herein-disclosed agents, it is contemplated that these agents will also be effective to destroy microorganism growth in other hydrocarbon-water systems. For example, the agents disclosed herein can be employed in biocidal amounts in the oil-water systems involved in cutting oil compositions and fire-resistant hydraulic fluids, to prevent growth of microorganisms therein.

Obviously, numerous modifications of the invention described hereinabove can be resorted to without departing from the spirit or scope thereof. Accordingly, only such limitations should be imposed on the invention as are indicated in the appended claims.

I claim:

1. A fuel composition, comprising a major amount of a liquid hydrocarbon fuel to which has been added about 0.02 to 0.2 percent by weight of a member selected from the group consisting of 2-nitroresorcinol, 4-nitroresorcinol, 4-nitrosoresorcinol and nitrocatechol.

2. The fuel composition of claim 1 where the fuel is an aviation turbine fuel.

3. The fuel composition of claim 1 where the fuel is a No. 2 fuel oil.

4. The fuel composition of claim 1 where said member is 2-nitroresorcinol.

5. The fuel composition of claim 1 where said member is 4-nitroresorcinol.

6. The fuel composition of claim 1 where said member is 4-nitrosoresorcinol.

7. The fuel composition of claim 1 where said member is nitrocatechol.

8. A binary liquid system comprising a predominant proportion of a liquid hydrocarbon fuel in contact with a relatively small amount of an aqueous phase, at least one of said fuel and said aqueous phase being contaminated with microorganisms, said system containing about 0.02 to 0.2 percent by weight of the fuel of a member of the group consisting of 2-nitroresorcinol, 4-nitroresorcinol, 4-nitrosoresorcinol and nitrocatechol.

9. The binary liquid system of claim 8 where the fuel is an aviation turbine fuel.

10. The binary liquid system of claim 8 where the fuel is a No. 2 fuel oil.

11. The binary liquid system of claim 8 where said member is 2-nitroresorcinol.

12. The binary liquid system of claim 8 where said member is 4-nitroresorcinol.

13. The binary liquid system of claim 8 where said member is 4-nitrosoresorcinol.

14. The binary liquid system of claim 8 where said member is nitrocatechol.

References Cited by the Examiner

UNITED STATES PATENTS

| 2,281,837 | 5/1942 | Johnson | 167—31 |
| 2,485,696 | 10/1949 | Chenicek | 44—75 |
| 2,975,042 | 3/1961 | Summers | 44—78 |
| 2,975,043 | 3/1961 | Ambrose | 44—78 |

OTHER REFERENCES

Reddish, "Antiseptics, Disinfectants, Fungicides, and Chemical and Physical Sterilization," Second Edition, 1957, pp. 545–546.

DANIEL E. WYMAN, *Primary Examiner.*

Y. M. HARRIS, *Assistant Examiner.*